(12) United States Patent
Hasegawa et al.

(10) Patent No.: US 8,411,359 B2
(45) Date of Patent: Apr. 2, 2013

(54) STEREOSCOPIC IMAGE DISPLAYING DEVICE AND A METHOD OF MANUFACTURING THE SAME

(75) Inventors: Hiroshi Hasegawa, Kanagawa (JP); Kazuo Nakamura, Kanagawa (JP); Jiro Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 278 days.

(21) Appl. No.: 12/857,241

(22) Filed: Aug. 16, 2010

(65) Prior Publication Data
US 2011/0051237 A1 Mar. 3, 2011

(30) Foreign Application Priority Data
Aug. 25, 2009 (JP) ................ P2009-194188

(51) Int. Cl.
*G02B 27/22* (2006.01)
*G02B 27/24* (2006.01)

(52) U.S. Cl. ........ 359/464; 359/462; 359/472; 359/463; 345/87

(58) Field of Classification Search ............ 359/462, 359/463, 464, 472, 613; 348/52; 345/6, 345/87
See application file for complete search history.

(56) References Cited

U.S. PATENT DOCUMENTS
6,219,184 B1 * 4/2001 Nagatani ................ 359/472
6,609,799 B1 * 8/2003 Myers ................ 359/613
7,477,220 B2 * 1/2009 Muto ................ 345/87

FOREIGN PATENT DOCUMENTS
JP 2008-218296 9/2008

* cited by examiner

*Primary Examiner* — Audrey Y Chang
(74) *Attorney, Agent, or Firm* — K&L Gates LLP

(57) ABSTRACT

A reflecting apparatus comprising: an array of reflectors including a first subset of reflectors and a second subset of reflectors, wherein the first subset of reflectors guide light toward a first viewing position and the second subset of reflectors guide light toward a second viewing position that is different from the first viewing position.

17 Claims, 15 Drawing Sheets

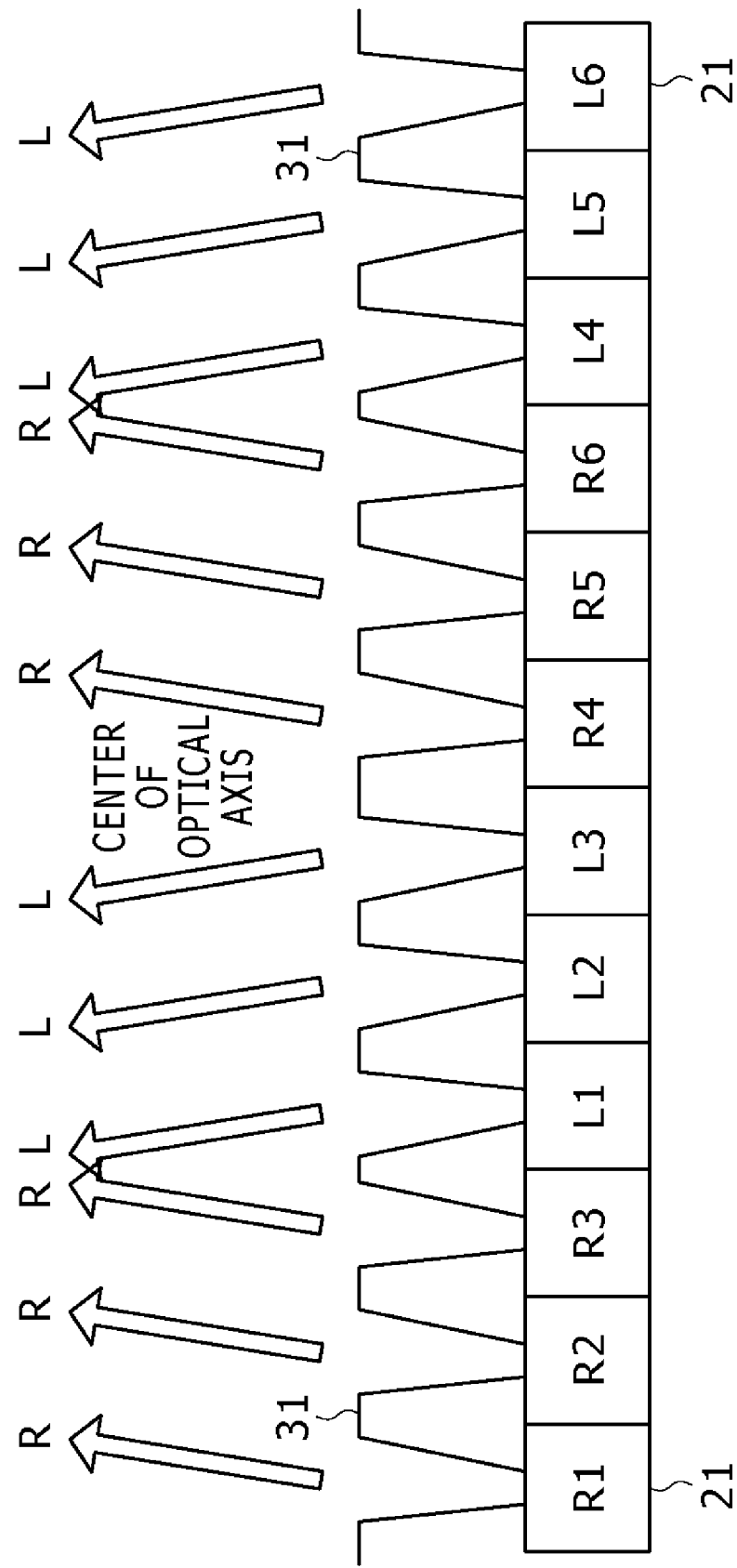

FIG.10A

| R1 | L1 | R2 | L2 | R3 | L3 | R4 | L4 |
|----|----|----|----|----|----|----|----|
| R5 | L5 | R6 | L6 | R7 | L7 | R8 | L8 |
| R9 | L9 | R10 | L10 | R11 | L11 | R12 | L12 |
| R13 | L13 | R14 | L14 | R15 | L15 | R16 | L16 |
| R17 | L17 | R18 | L18 | R19 | L19 | R20 | L20 |
| R21 | L21 | R22 | L22 | R23 | L23 | R24 | L24 |

| R1 | R2 | R3 | R4 | R5 | R6 | R7 | R8 |
|----|----|----|----|----|----|----|----|
| L1 | L2 | L3 | L4 | L5 | L6 | L7 | L8 |
| R9 | R10 | R11 | R12 | R13 | R14 | R15 | R16 |
| L9 | L10 | L11 | L12 | L13 | L14 | L15 | L16 |
| R17 | R18 | R19 | R20 | R21 | R22 | R23 | R24 |
| L17 | L18 | L19 | L20 | L21 | L22 | L23 | L24 |

| R1 | L1 | R2 | L2 | R3 | L3 | R4 | L4 | ~21 |
|---|---|---|---|---|---|---|---|---|
| L5 | R5 | L6 | R6 | L7 | R7 | L8 | R8 | |
| R9 | L9 | R10 | L10 | R11 | L11 | R12 | L12 | |
| L13 | R13 | L14 | R14 | L15 | R15 | L16 | R16 | |
| R17 | L17 | R18 | L18 | R19 | L19 | R20 | L20 | |
| L21 | R21 | L22 | R22 | L23 | R23 | L24 | R24 | |

STEREOSCOPIC IMAGE DISPLAYING DEVICE AND A METHOD OF MANUFACTURING THE SAME

CROSS REFERENCES TO RELATED APPLICATIONS

The present application claims priority to Japanese Patent Application JP 2009-194188 filed on Aug. 25, 2009, the entire contents of which is hereby incorporated by reference.

BACKGROUND

The present disclosure relates to a stereoscopic image displaying device and a method of manufacturing the same, and more particularly to a display device for displaying thereon a three-dimensional stereoscopic image by using a naked-eye system and a method of manufacturing the same with which the display device for displaying thereon the three-dimensional stereoscopic image using the naked-eye system can be readily manufactured.

In recent years, three-dimensional stereoscopic image contents based on which an image can be sterically visualized have attracted attention. With regard to an appreciation system for a three-dimensional stereoscopic image, a binocular parallax system for causing a viewer to appreciate an image for a left-hand side eye, and an image for a right-hand side eye for which a parallax is provided is being widely used. With regard to the binocular parallax system, there are roughly given two kinds of systems, that is, a glass system using a pair of glasses, and a naked-eye system using no pair of glasses.

In addition, the glass system is classified into a polarization system and a shutter system. In this case, in the polarization system, an image for a left-hand side eye, and an image for a right-hand side eye are separated from each other by utilizing a difference in polarization as a property of a light. Also, in the shutter system, a pair of glasses is given a shutter function of alternately opening and closing a right-hand side glass and a left-hand side glass, and an operation of the shutter is synchronized with an image for a left-hand side eye, and an image for a right-hand side eye which are displayed in a time division manner. The glass system has a merit that the image for the left-hand side eye, and the image for the right-hand side eye can be relatively, readily separated from each other. On the other hand, it can also be said that the glass system has a burden that it is necessary to plank a pair of glasses on the viewer's nose as a demerit.

On the other hand, the naked-eye system is classified into a lenticular screen system, a parallax barrier system and the like. The lenticular screen system, as shown in FIG. 1, is a system such that hog-backed fine lenses (lenticular lenses) are disposed, thereby separating an optical path of an image for a left-hand side eye, and an optical path of an image for a right-hand side eye from each other. On the other hand, the parallax barrier system, as shown in FIG. 2, is a system such that an optical path of an image for a left-hand side eye, and an optical path of an image for a right-hand side eye are separated from each other by longitudinal slits (parallax barriers). It is noted that "Lx" and "Rx" (x: numeral) in FIGS. 1 and 2 represent a pixel in which the image for the left-hand side eye, and the image for the right-hand side eye are displayed, respectively.

The naked-eye system has a merit such that contrary to the glass system, the burden imposed on the viewer is less because it is unnecessary to plank a pair of glasses on the viewer's nose. On the contrary, although the naked-eye system has a side such that an observation position and a visible range are limited, the practical use of the naked-eye system has progressed in a display device of a mobile phone or a personal computer in which the observation position and the visible range are relatively limited.

A liquid crystal display device, and an organic Electro Luminescent (EL) display device using an organic EL element as a self-light emitting element are known as the display device for displaying thereon a three-dimensional stereoscopic image. In some of the organic EL display devices, a reflector is provided in the periphery of the self-light emitting element, thereby enhancing an efficiency of taking out a light for light emission made by the self-light emitting element. This organic EL display device, for example, is described in Japanese Patent Laid-Open No. 2008-218296.

SUMMARY

In the parallax barrier system and the lenticular screen system, the pixels in which the image for the left-hand side eye is displayed, and the pixels in which the image for the right-hand side eye is displayed are alternately disposed in any one of the horizontal direction or the vertical direction, whereby the image for the left-hand side eye, and the image for the right-hand side eye are separated from each other so as to enter the left-hand side eye and the right-hand side eye of the viewer, respectively. For this reason, barrier processing by the very fine lenses needs to be carried out so that the vertical stripes of the barriers become inconspicuous, and also the lenses and the barriers need to be precisely aligned with each other so as to correspond to the display surface. In particular, in the liquid crystal display device, the lenticular lenses or the film having the parallax barriers formed thereon need to be precisely aligned with the pixels of the liquid crystal, respectively. Therefore, since the accurate processing needs to be additionally carried out, there is caused such a problem that the cost is increased as compared with the normal display device.

The embodiments solve the problems described above, and are therefore desirable to provide a display device for displaying thereon a three-dimensional stereoscopic image by using a naked-eye system and a method of manufacturing the same with which the display device for the three-dimensional stereoscopic image by using the naked-eye system can be readily manufactured.

According to an embodiment, a reflecting apparatus includes an array of reflectors including a first subset of reflectors and a second subset of reflectors. The first subset of reflectors guide light toward a first viewing position and the second subset of reflectors guide light toward a second viewing position that is different from the first viewing position.

In another embodiment, a display device includes a pixel array including a plurality of pixels, each pixel including a light emitting portion, and a plurality of reflectors, one of said reflectors provided on a front surface of each of the pixels. The plurality of reflectors include a first subset of reflectors that direct light emitted from the respective light emitting portions toward a first viewing position, and a second subset of reflectors that direct light emitted from the respective light emitting portions toward a second viewing position that is different from the first viewing position.

In another embodiment, a stereoscopic video display system includes a pixel array including a plurality of pixels, each pixel including a light emitting portion, and a plurality of reflectors, one of said reflectors provided on a front surface of each of the pixels. In this embodiment, the light emitting portions cooperate with the reflectors to enable stereoscopic display of images in a plurality of different rotational orientations of the stereoscopic video display system.

As set forth hereinabove, according to the embodiments, it is possible to provide the stereoscopic image displaying device which displays thereon the three-dimensional stereoscopic image by using the naked-eye system and which can be readily manufactured, and the method of manufacturing the same with which the stereoscopic image displaying device for displaying thereon the three-dimensional stereoscopic image by using the naked-eye system can be readily manufactured.

Additional features and advantages are described herein, and will be apparent from the following Detailed Description and the figures.

BRIEF DESCRIPTION OF THE FIGURES

FIG. 9 is a cross sectional view showing formation of the reflector shown in FIGS. 5 and 6;

FIGS. 10A and 10B are respectively diagrams each showing a first disposition example of pixels for a left-hand side eye, and pixels for a right-hand side eye;

FIG. 11 is a diagram showing a second disposition example of pixels for the left-hand side eye, and pixels for the right-hand side eye;

DETAILED DESCRIPTION

Embodiments will be described in detail hereinafter with reference to the accompanying drawings.

Configuration of Display Device

Figure 1:
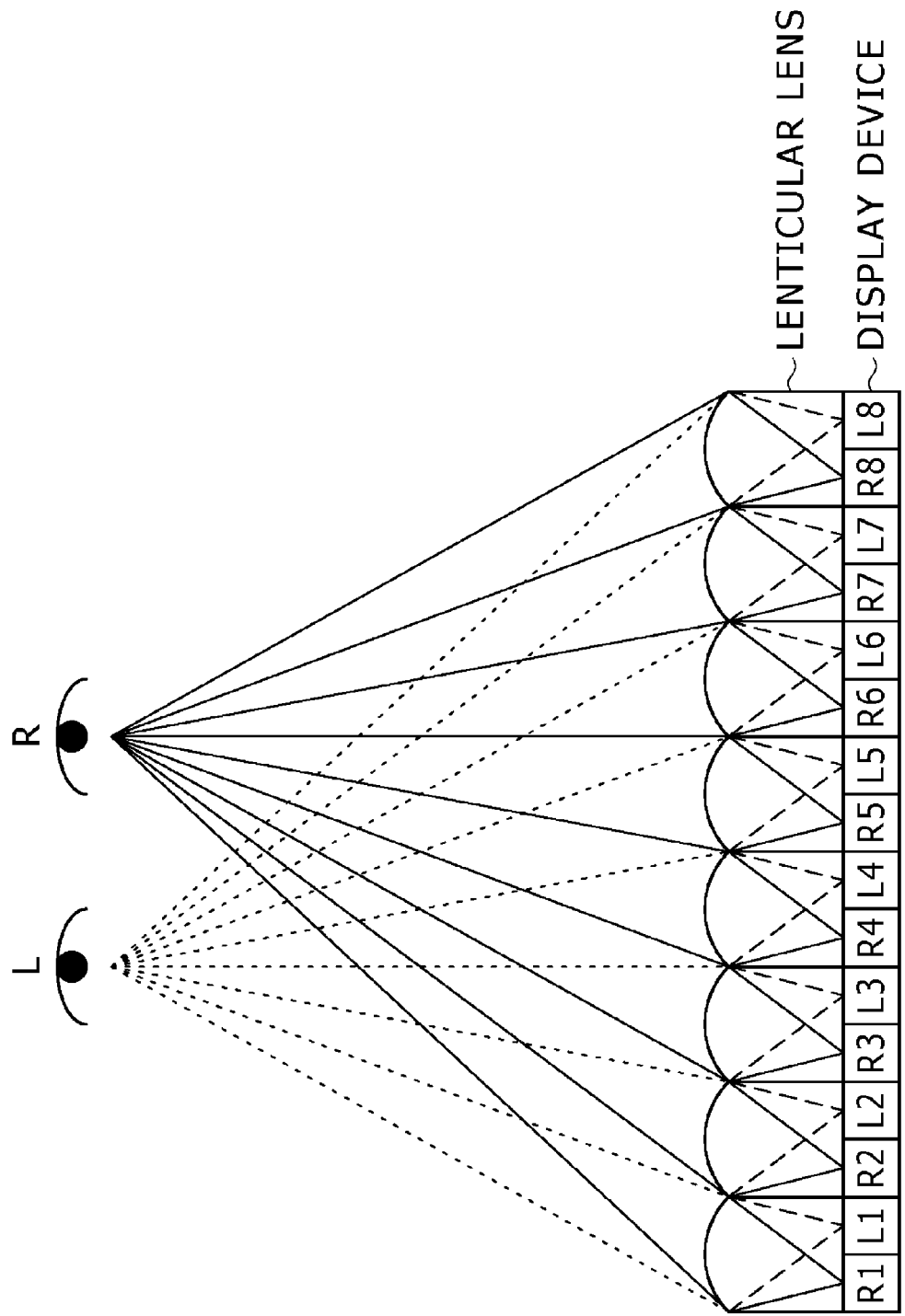
FIG. 1 is a schematic view explaining an existing lenticular screen system.
Figure 2:
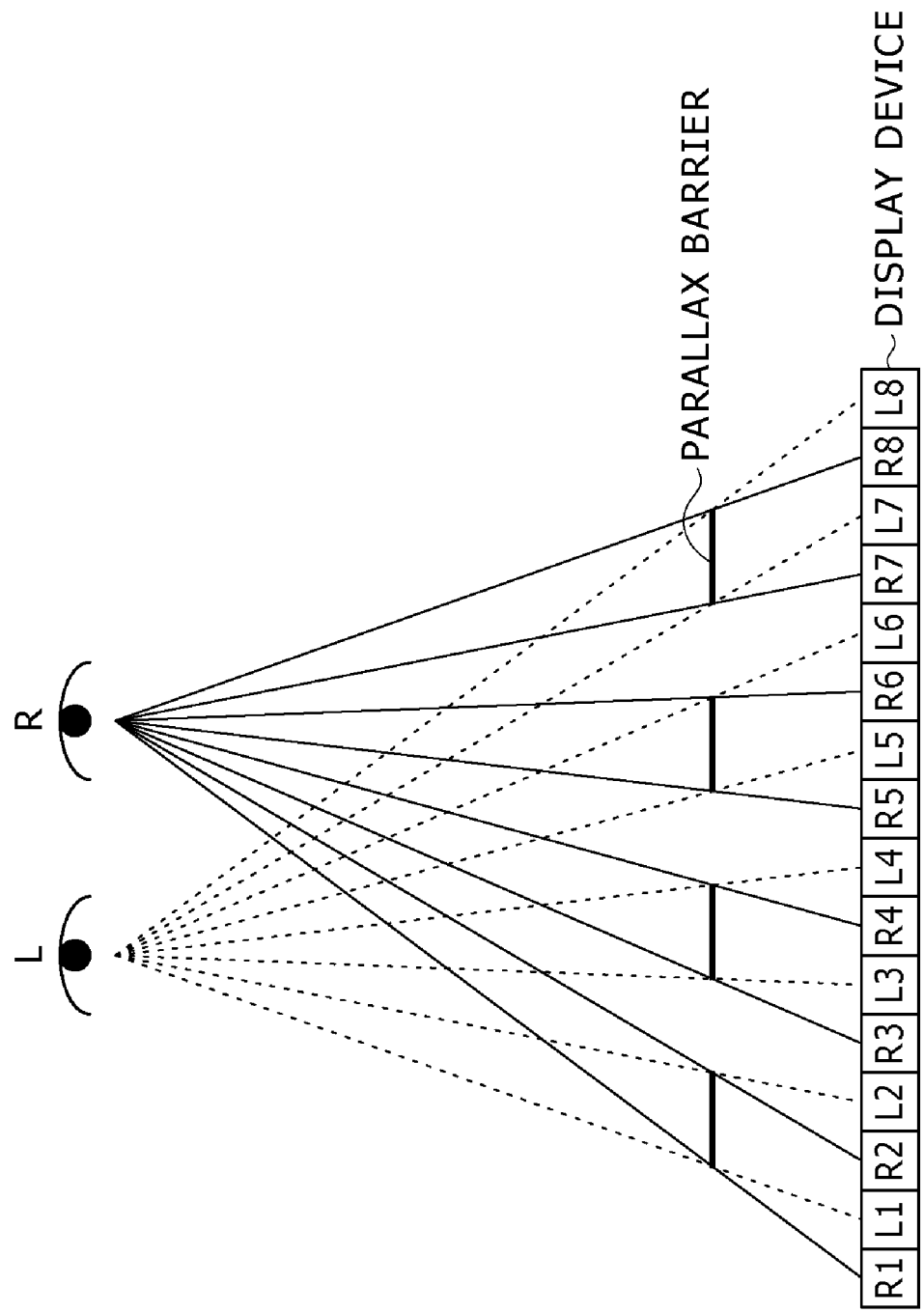
FIG. 2 is a schematic view explaining an existing parallax barrier system.
Figure 3:
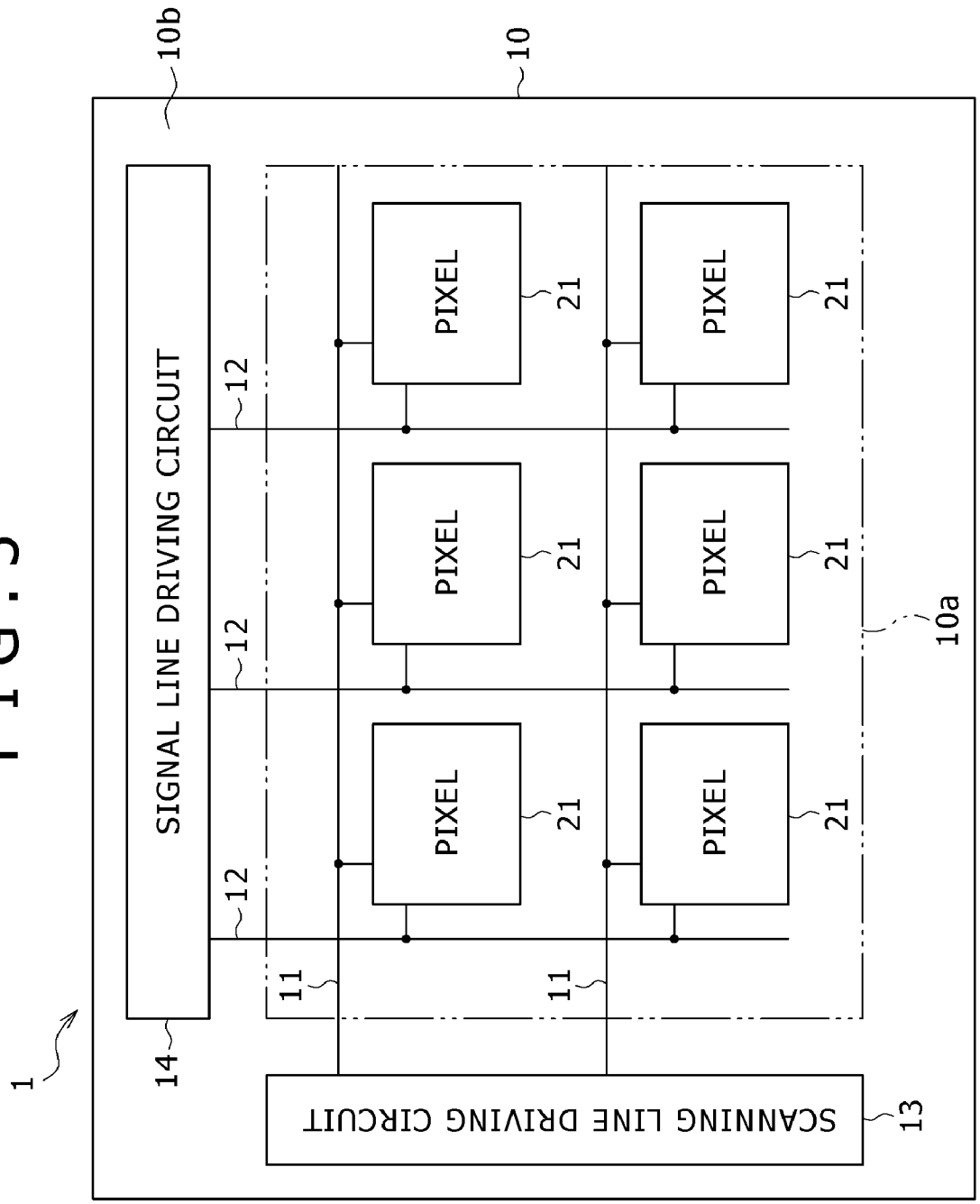
FIG. 3 is a block diagram showing a configuration of a display device according to an embodiment.

FIG. 3 is a block diagram showing a configuration of a display device according to an embodiment.

The display device 1 shown in FIG. 3 is a stereoscopic image displaying device which can display thereon a three-dimensional stereoscopic image, and is also an active matrix display device which uses an organic EL element as a light emitting element, and which is referred to as an organic EL display device.

A substrate 10 of the display device 1 is composed of a pixel array portion 10a and a peripheral circuit portion 10b. A plurality of scanning lines 11 and a plurality of signal lines 12 are disposed transversely and longitudinally in the pixel array portion 10a, respectively. Also, a plurality of pixels 21 are disposed in a matrix in a plane in such a way that one pixel 21 is disposed so as to correspond to an intersection portion between one scanning line 11 and one signal line 12. A scanning line driving circuit 13 and a signal line driving circuit 14 are disposed in the peripheral circuit portion 10b. In this case, the scanning line driving circuit 13 successively drives and scans a plurality of scanning lines 11. Also, the signal line driving circuit 14 supplies a video signal (that is, an input signal) corresponding to luminance information to a plurality of signal lines 12.

It is noted that the organic EL elements corresponding to color components of R, G and B, respectively, are woven with one another in the pixel array portion 10a in order to carry out full color compliant image display, and are pattern-disposed in a matrix so as to comply with a predetermined rule. Although the number of dispositions of organic EL elements, and formation areas of the organic EL elements are expected to be equal among the individual color components, the number of dispositions of organic EL elements, and the formation areas of the organic EL elements may be made different among the individual color components so as to correspond to energy components by the individual color component.

Pixel Circuit of Pixel 21

Figure 4:
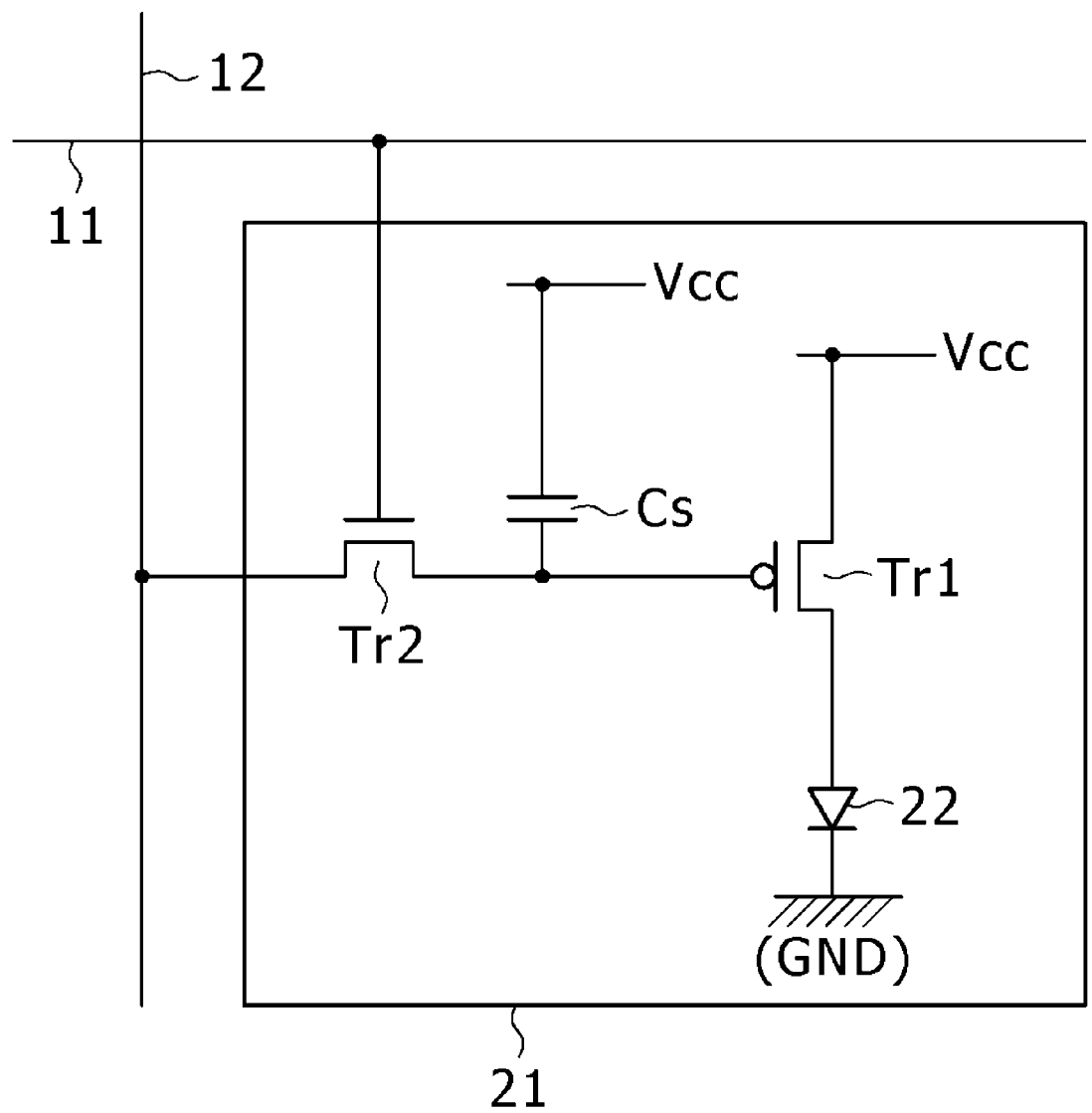
FIG. 4 is a circuit diagram showing a circuit configuration of one pixel in the display device according to the embodiment.

FIG. 4 shows a circuit configuration of the pixel 21.

The pixel 21 is composed of an organic EL element 22 as a self-light emitting element, a drive transistor Tr1, a write transistor (scanning transistor) Tr2, and a storage capacitor Cs. In the pixel 21, by the driving operation made by the scanning line driving circuit 13, the video signal which is written from the corresponding one of the signal lines 21 to the pixel 21 through the write transistor Tr2 is held in the storage capacitor Cs. Also, a current corresponding to an amount of video signal thus held is supplied to the organic EL element 22, so that the organic EL element 22 emits a light at a luminance corresponding to a value of the current.

It should be noted that the configuration of the pixel circuit as described above is merely as example, and thus a capacitor(s) may be provided in the pixel 21 as may be necessary, or the pixel circuit may be configured by providing a plurality of transistors in the pixel 21. In addition, a necessary drive circuit can be added to the peripheral circuit portion 10*b* in accordance with the change of the pixel circuit.

In the display device 1 having the circuit configuration as described above, the pixels 21 are allotted to the pixels 21 which display thereon an image for a left-hand side image (hereinafter referred to as "the pixel 21 for a left-hand side image" as well), and the pixels 21 which display thereon an image for a right-hand side image (hereinafter referred to as "the pixel 21 for a right-hand side image" as well). Also, lights of the image for the left-hand side eye emitted from the pixels 21 for the left-hand side eye, or lights of the image for the right-hand side image emitted from the pixels 21 for the right-hand side image are made incident to the left-hand side eye or the right-hand side eye of a viewer, respectively, thereby making it possible for the viewer to appreciate a three-dimensional stereoscopic image by his/her naked-eyes.

Shape of Front Surface of Pixel Array Portion 10*a*

Figure 5:
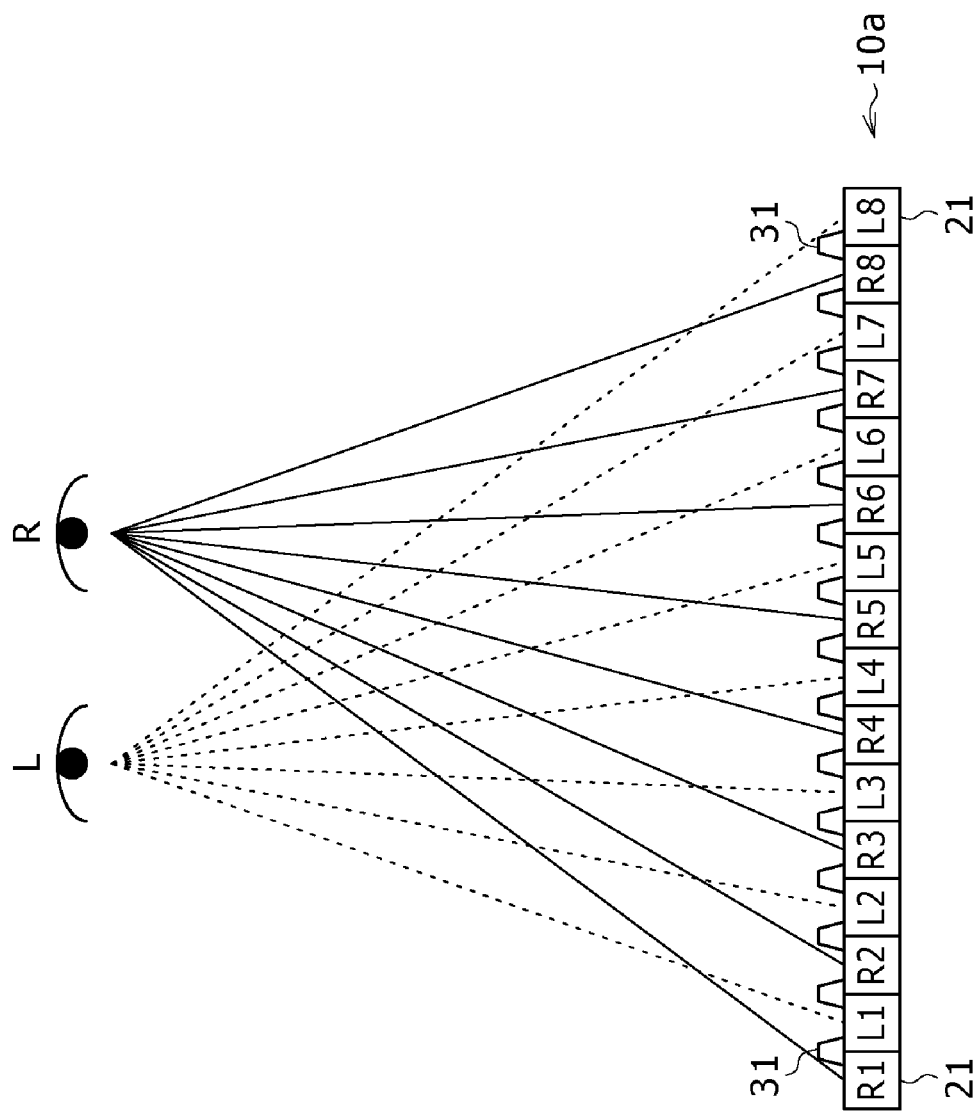
FIG. 5 is a cross sectional view of a pixel array portion in the display device shown in FIG. 3.

FIG. 5 is a cross sectional view showing a structure of the pixel array portion 10*a*.

The pixel array portion 10*a* includes reflectors 31 each of which plays a part of a reflecting mirror, and which are provided on front surfaces of the pixels 21, respectively. It is noted that in FIG. 5, only the pixels 21 on both sides of the pixel array portion 10*a*, and the reflectors 31 corresponding thereto are designated with reference numerals 21 and 31, respectively.

The reflector 31, as shown in FIG. 5, guides the light of the image for the left-hand side eye emitted from the pixel 21 for the left-hand side eye, and the light of the image for the right-hand side eye emitted from the pixel 21 for the right-hand side eye in a direction of the left-hand side eye of the viewer, and in a direction of the right-hand side eye of the viewer, respectively. That is to say, the display device 1 separates an optical path of the image for the left-hand side eye, and an optical path of the image for the right-hand side eye from each other by the reflector 31, thereby making it possible for the viewer to appreciate the three-dimensional stereoscopic image by his/her naked-eyes.

Figure 6:
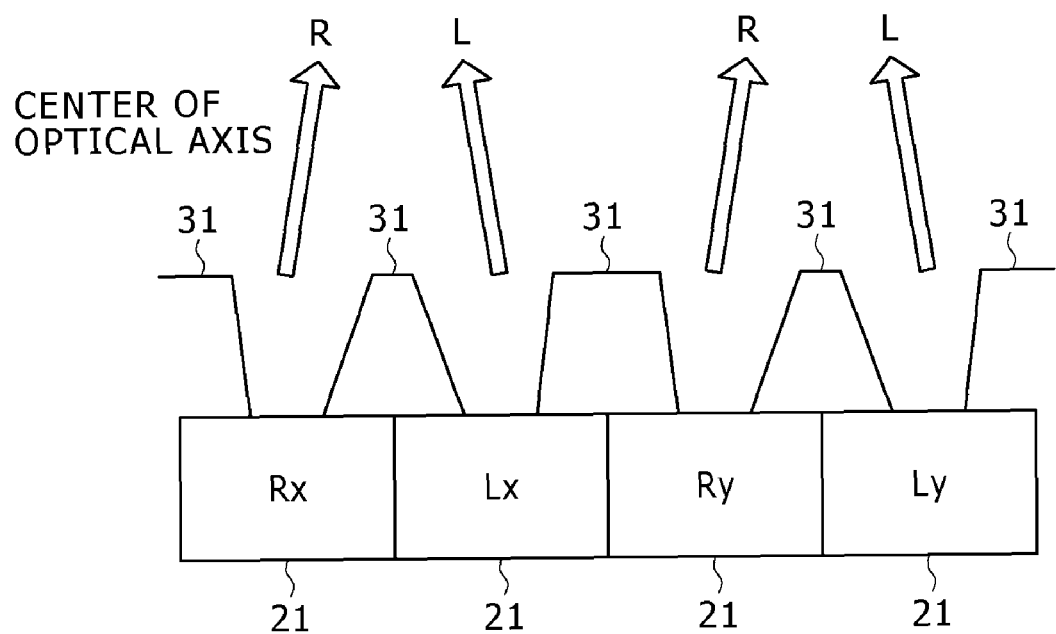
FIG. 6 is an enlarged view of a part of the pixel array portion in the display device shown in FIG. 3.

FIG. 6 is an enlarged view of a part of the pixel array portion 10*a* shown in FIG. 5.

As shown in FIG. 6, the reflector 31 is formed at a predetermined angle so as to have a trapezoidal shape when viewed from a side surface side. Thus, a center of an optical axis of a light from the pixel 21 for the right-hand side eye is directed to the right-hand side eye of the viewer, and a center of an optical axis of a light from the pixel 21 for the left-hand side eye is directed to the left-hand side eye of the viewer.

FIGS. 5 and 6 are respectively cross sectional views in the case where the pixel array portion 10*a* is viewed from the vertical direction. However, in the case as well where the pixel array portion 10*a* is viewed from the horizontal direction, similarly to the case of FIG. 6, an inclination of the reflector 31 is formed on the pixel 21 in such a way that the center of the optical axis is directed to the left-hand side eye or right-hand side eye of the viewer.

Figure 7:
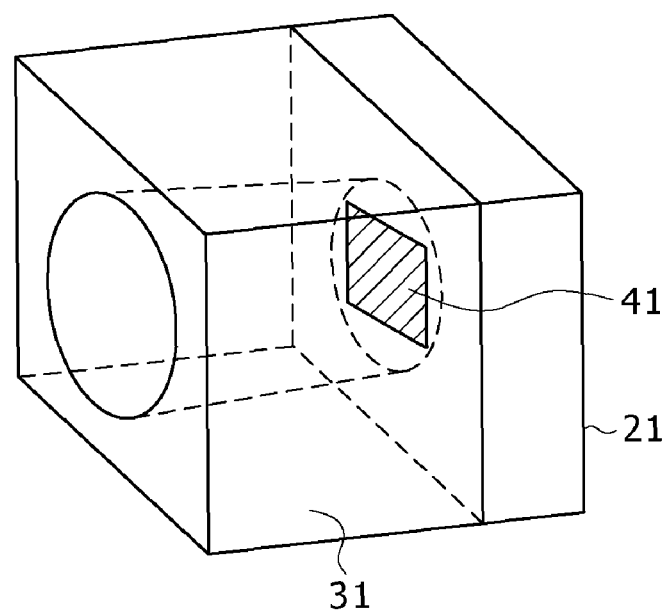
FIG. 7 is a perspective view showing a construction of a reflector shown in FIGS. 5 and 6.

FIG. 7 is a perspective view showing a shape of the reflector 31 in predetermined one pixel 21.

As shown in FIG. 7, the reflector 31 has a conical mirror surface with a light emission surface 41 of an organic EL element 22 as a center for one pixel 21 as with a headlight of an automobile. In addition, in the reflector 31, a function of adjusting an angle as an optical axis of the headlight is determined by a conical inclination (angle) of the reflector 31. The conical inclination of the reflector 31 can be set (changed) every pixel 21 in accordance with a distance set as the size of the display device 1 and a distance to the viewer.

Figure 8:
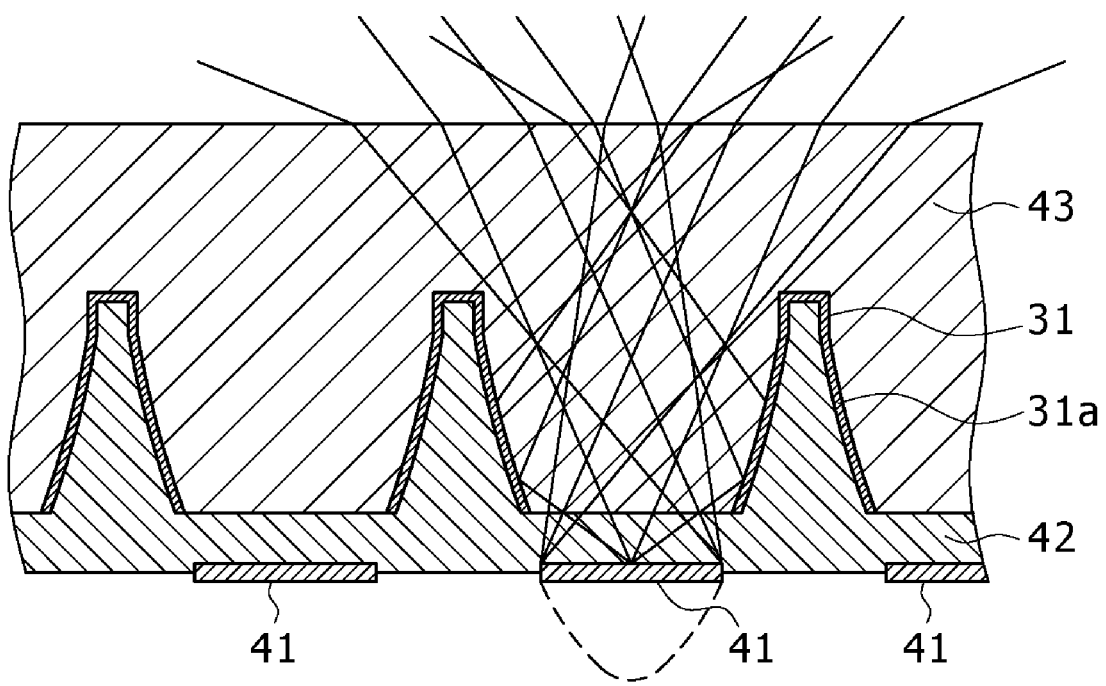
FIG. 8 is a cross sectional view showing a method of forming the reflector shown in FIGS. 5 and 6.

FIG. 8 is a cross sectional view showing a method of forming the reflector 31. It is noted that in FIG. 8, the conical inclinations of the reflectors 31 are unified for the individual pixels 21 for the sake of simplicity of illustration.

The light emission surface 41 side of each of the pixels 21 is covered with an adhesive agent layer 42 and a transparent substrate 43. Each of the adhesive agent layer 42 and the transparent substrate 43 has a light permeability. However, the transparent substrate 43 is molded to have irregularities so as to correspond to the light emission surface 41. Also, a light reflecting surface 31*a* formed from either a metallic reflecting layer made of aluminum (Al) or silver (Ag) and having a high light reflectivity, or a multilayer thin film containing the metallic reflecting layer is formed in a part of an interface between the adhesive agent layer 42 having the irregularities, and the transparent substrate 43.

That is to say, a surface of the adhesive agent layer 42 which is erected in the periphery of the light emission surface 41 so as to protrude along the light emission direction is covered with either the metallic reflecting layer or the multilayer thin film to form the light reflecting surface 31*a*, thereby making it possible to construct the reflector 31. Also, the light emission surface 41 and the light reflecting surface 31*a* of the reflector 31 are each covered with the transparent substrate 43 having the light permeability. As a result, after a light from the light emission surface 41 is reflected by the light reflecting surface 31*a* of the reflector 31 as may be necessary, the light thus reflected is emitted from a surface of the transparent substrate 43 toward a side of an air layer contacting the surface of the transparent substrate 43.

It is noted that the pixel 21 described above is a so-called sub-pixel, and thus one pixel (display pixel) as a display unit is composed of three pixels 21 of red (R), green (G) and blue (B). For this reason, the inclination of the reflector 31 can also be formed every three pixels 21 of R, G and B in such a way that the center of the optical axis is directed either to the direction of the right-hand side eye of the viewer or to the direction of the left-hand side eye of the viewer.

First Disposition Example of Pixels 21 for Left-Hand Side Eye and Pixels 21 for Right-Hand Side Eye FIGS. 10A and 10B show a first disposition example of the pixels 21 for the left-hand side eye, and the pixels 21 for the right-hand side eye.

FIG. 10A shows a disposition example in which the pixels 21 for the left-hand side eye, and the pixels 21 for the right-hand side eye are separated from each other in a transverse direction. That is to say, in the disposition example shown in FIG. 10A, one column of the pixels 21 in a longitudinal direction is disposed so as to become either a column of the pixels 21 for the left-hand side eye or a column of the pixels 21 for the right-hand side eye. Thus, the columns of the pixels 21 for the left-hand side eye, and the columns of the pixels 21 for the right-hand side eye are alternately disposed in the transverse direction.

On the other hand, FIG. 10B shows a disposition example in which the pixels 21 for the left-hand side eye, and the pixels 21 for the right-hand side eye are separated from each other in the longitudinal direction. That is to say, in the disposition example shown in FIG. 10B, one column of the pixels 21 in the transverse direction is disposed so as to become either a column of the pixels 21 for the left-hand side eye or a column of the pixels 21 for the right-hand side eye. Thus, the columns of the pixels 21 for the left-hand side eye, and the columns of the pixels 21 for the right-hand side eye are alternately disposed in the longitudinal direction.

In the existing lenticular screen system or parallax barrier system, the lenticular lens or the parallax barriers are formed in columns either in the longitudinal direction or in the transverse direction. For this reason, the disposition of the pixels 21 for the left-hand side eye and the pixels 21 for the right-hand side eye is limited to the disposition example as shown in FIG. 10A or 10B in which the pixels 21 for the left-hand side eye and the pixels 21 for the right-hand side eye are separated from each other in columns.

However, in such a disposition example, when the pixels 21 for the left-hand side eye and the pixels 21 for the right-hand side eye are separated from each other in the transverse direction, a horizontal resolution becomes half. On the other hand, when the pixels 21 for the left-hand side eye and the pixels 21 for the right-hand side eye are separated from each other in the longitudinal direction, a vertical resolution becomes half.

Second Disposition Example of Pixels 21 for Left-Hand Eye and Pixels 21 for Right-Hand Eye In the display device 1, for the purpose of solving the problem as described above, a disposition, as shown in FIG. 11, can be carried out in which the pixels 21 for the left-hand side eye and the pixels 21 for the right-hand side eye are separated from each other so as to show a checkered pattern. That is to say, FIG. 11 shows a second disposition example of the pixels 21 for the left-hand side eye and the pixels 21 for the right-hand side eye in the display device 1.

In the display device 1, the pixels 21 for the left-hand side eye and the pixels 21 for the right-hand side eye are disposed in the checkered pattern, whereby the three-dimensional stereoscopic image can be appreciated by the naked-eyes of the viewer without reducing the resolution of only one of the horizontal direction or the vertical direction. That is to say, it is possible to appreciate the high-definition three-dimensional stereoscopic image, by the naked-eyes of the viewer, for which the deterioration feeling of the resolution is suppressed.

As described with reference to FIG. 7, since in the display device 1, the conical inclination of the reflector 31 can be set every pixel 21, the disposition having the checkered pattern as shown in FIG. 11 can be carried out. Such a disposition is difficult to carry out in the existing lenticular screen system or parallax barrier system in which the lenticular lenses or the parallax barriers are formed in columns either in the longitudinal direction or in the transverse direction.

In addition, in the existing system, for the purpose of suppressing a phenomenon called a cross-talk that each of the image for the left-hand side eye, and the image for the right-hand side eye which are to be separated from each other to be directed to the left-hand side eye and the right-hand side eye, respectively, is directed to both the left-hand side eye and the right-hand side eye, it is necessary to take the measures for reducing the aperture ratio or doubling the barrier. For this reason, as compared with the normal two-dimensional image display, it is difficult to promote the high image quality for the three-dimensional stereoscopic image display. However, according to the display device 1, since the pixels 21 for the left-hand side eye and the pixels 21 for the right-hand side eye are disposed in the checkered pattern, thereby making it possible to suppress the deterioration feeling of the resolution, it is possible to promote the high image quality for the three-dimensional stereoscopic image display.

Figure 12:
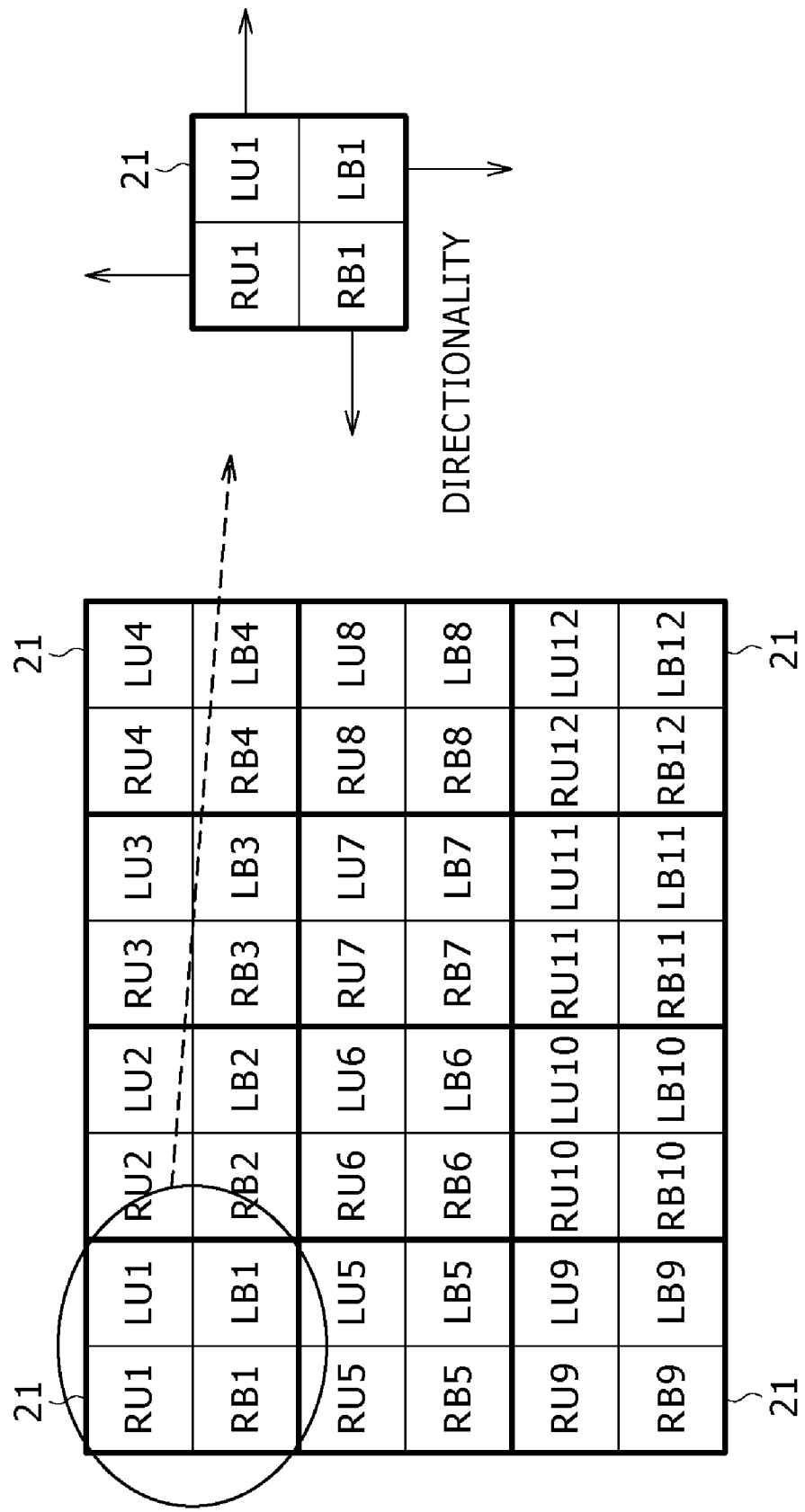
FIG. 12 is a diagram showing a third disposition example of pixels for the left-hand side eye, and pixels for the right-hand side eye.
Figure 13:
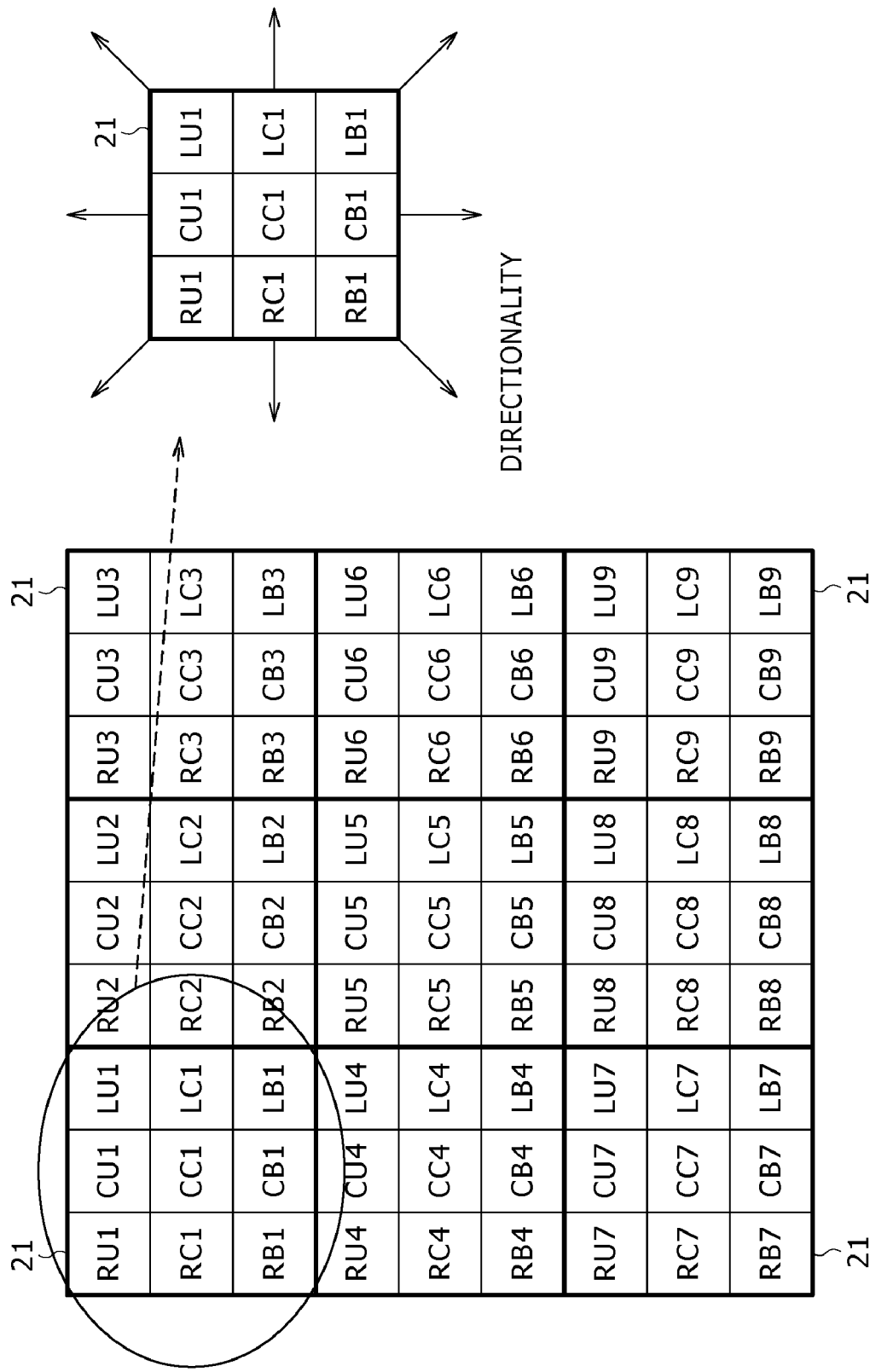
FIG. 13 is a diagram showing an extended case of the third disposition example of the pixels for the left-hand side eye, and the pixels for the right-hand side eye.

Third Disposition Example of Pixels 21 for Left-Hand Side Eye and Pixels 21 for Right-Hand Side Eye FIGS. 12 and 13 respectively show a third disposition example and an extended case thereof of the pixels 21 for the left-hand side eye, and the pixels 21 for the right-hand side eye in the display device 1.

Some of the recent mobile phones use both the display by the longitudinally long picture, and the display by the transversely long picture as the use applications or the like by rotating the display screen. However, in each of the dispositions shown in FIGS. 10A and 10B, and FIG. 11, the appreciation for the three-dimensional stereoscopic image is limited to any one of the longitudinally long picture (first direction) or the transversely long picture (a second direction vertical to the first direction).

In order to cope with such a situation, in the third disposition example shown in FIG. 12, the pixels 21 are disposed in a matrix with each adjacent four pixels 21 in which the reflectors 31 are formed so as to give the four directions, i.e., up, down, left and right directions the directionalities of lights as one bundle.

That is to say, the reflectors 31 are respectively formed on each adjacent four pixels as one bundle in such a way that the pixel 21 of "RUx," the pixel 21 of "RBx," the pixel 21 of "LUx," and the pixel 21 of "LBx" are given the directionalities of the lights in the up direction, in the left direction, in the right direction, and in the down direction, respectively. In this case, when the viewer appreciates the image as the transversely long picture, the pixel 21 of "RBx," and the pixel 21 of "LUx" function either as the pixel 21 for the right-hand side eye, or as the pixel 21 for the left-hand side eye. That is to say, the left direction of the pixel 21 of "BRx," or the right direction of the pixel 21 of "LUx" means that the reflector 31 is formed in such a way that the center of the optical axis is directed either to the left-hand side eye or to the right-hand side eye when the viewer appreciates the image as the transversely long picture. On the other hand, when the viewer appreciates the image as the longitudinally long picture, the pixel 21 of "LBx" and the pixel 21 of "RUx" function either as the pixel 21 for the right-hand side eye, or as the pixel 21 for the left-hand side eye. That is to say, the down direction of the pixel 21 of "LBx" or the up direction of the pixel 21 of "RUx" means that the reflector 31 is formed in such a way that the center of the optical axis is directed either to the left-hand side eye or to the right-hand side eye when the viewer appreciates the image as the longitudinally long picture.

In such a manner, by carrying out the third disposition example shown in FIG. 12, even when both the display by the longitudinally long picture, and the display by the transversely long picture are used as the use applications or the like by rotating the display screen, the three-dimensional stereoscopic image can be appreciated in both the cases.

FIG. 13 shows an extended case of the third disposition example of the pixels 21 for the left-hand side eye, and the pixels 21 for the right-hand side eye, and thus shows the disposition example in which eight directions are given the directionalities of the lights, respectively.

That is to say, the reflectors 31 are respectively formed on the five pixels in such a way that the pixel 21 of "RUx," the pixel 21 of "RCx," the pixel 21 of "RBx," the pixel 21 of "CUx," and the pixel 21 of "CBx" are given the directionalities of the lights in the up left direction, in the left direction, in the bottom left direction, in the up direction, and in the down direction, respectively. In addition, the reflectors 31 are respectively formed on the three pixels 21 in such a way that the pixel 21 of "LUx," the pixel 21 of "LCx," and the pixel 21 of "LBx" are given the directionalities of the lights in the up right direction, in the right direction, and in the bottom right direction, respectively.

As a result, even in the intermediate orientation between the orientation of the display by the longitudinally long picture, and the orientation of the display by the transversely long picture, the three-dimensional stereoscopic image can be appreciated, and thus the three-dimensional stereoscopic image can be appreciated in all points of view of 360°.

Here, each of the third disposition example shown in FIG. 12, and the extended case of the third disposition example shown in FIG. 13, when the picture is appreciated from all the points of view, the pixels 21 exist which are not visualized by the viewer. For example, in the third disposition example shown in FIG. 12, when the display device 1 carries out the display in the form of the transversely long picture, the pixel 21 of "RBx," and the pixel 21 of "LUx" function as the pixel 21 for the right-hand side eye, or the pixel 21 for the left-hand side eye. Therefore, none of the light (image) from the pixel 21 of "LBx," and the light (image) from the pixel 21 of "RUx" is visualized by the viewer. In this case, the display device 1 can carry out the control in such a way that no light is emitted from any of the pixels 21 each having the directionality of the light which is not visualized from the point of view of the viewer. That is to say, the display device 1 can carry out the control for switching the pixels 21 from which the lights are to be emitted in accordance with the point of view of the viewer. As a result, it is possible to suppress the unnecessary light emission, and thus it is possible to reduce the power consumption of the display device 1.

As described above, in the display device 1, the reflector 31 is provided in the periphery of the light emission surface 41 of each of the pixels 21, thereby separating the optical path of the image for the left-hand side image, and the optical path of the image for the right-hand side image from each other. As a result, the three-dimensional stereoscopic image can be appreciated by the naked-eyes of the viewer.

In general, the provision of the reflector 31 in the periphery of the light emission surface 41 of each of the pixels 21 results in that the directionality of the light is emphasized, and thus the angle-of-field characteristics for the picture are reduced, which is a demerit in terms of the display device. However, in the display device 1, the emphasis of the directionality of the light is further increased, and thus the reflector 31 is formed in such a way that angles at which the light from the pixels 21 for the right-hand side eye, and the light from the pixels 21 for the left-hand side eye are made incident to the right-hand side eye and the left-hand side eye, respectively, become the centers of the respective optical axes. As a result, the three-dimensional stereoscopic image can be appreciated by using the naked-eyes of the viewer.

Method of Manufacturing Display Device 1

An embodiment of a method of manufacturing the display device 1 includes the steps of: disposing a plurality of pixels 21 each having the self-light emitting element in a matrix; forming the reflectors 31 which are erected in peripheries of the self-light emitting elements of plurality of pixels 21, respectively, so as to protrude along the light emission direction in such a way that the center of the optical axis of the light from the pixel is directed in the predetermined direction; and forming the inclinations of the reflectors 31 in such a way that the center of the optical axis of the light from the pixel in which the image for the left-hand side eye is displayed is directed to the left-hand side eye of the viewer, and the center of the optical axis of the light from the pixel in which the image for the right-hand side eye is displayed is directed to the right-hand side eye of the viewer.

In the method of manufacturing the display device 1, since a special film needs not to be stuck unlike the existing parallax barrier system or lenticular screen system, a loss of each of the lights emitted from the respective pixels 21 is less. In addition, since the special film needs not to be stuck, the picture alignment or the like for the film needs not to be carried out, and thus the display device 1 can be manufactured in the less number of manufacture processes and at a low cost. That is to say, according to the method of manufacturing the display device 1, it is possible to readily manufacture the display device 1 for displaying thereon the three-dimensional stereoscopic image by using the naked-eye system.

The display device 1 of the embodiment described above can be used so as to be incorporated as a display portion in various kinds of electronic apparatuses.

Application Examples of Display Device 1

Figure 14:
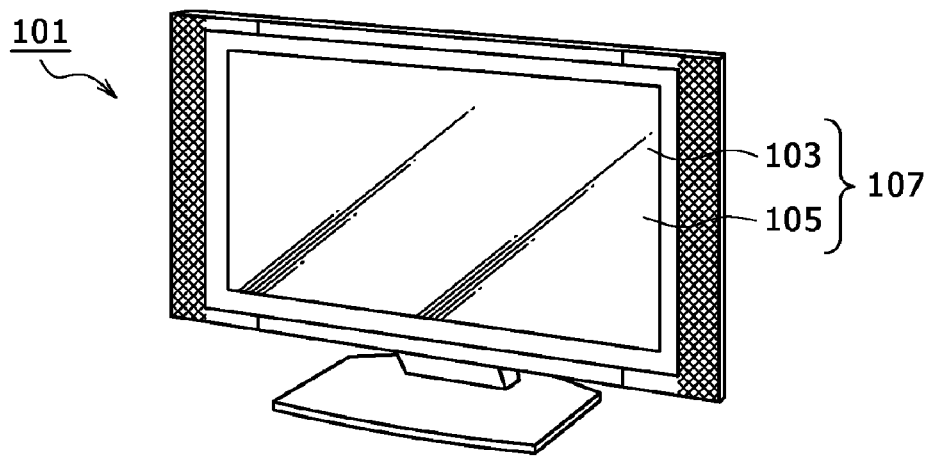
FIG. 14 is a perspective view showing a television receiver as a concrete example of an electronic apparatus to which the display device of the embodiment is applied.

FIG. 14 is a perspective view of a television receiver 101 as a concrete example of the electronic apparatus having the display device 1 incorporated therein.

A display screen 107 composed of a front panel 103, a filter glass 105, and the like is disposed in the television receiver 101 shown in FIG. 14. A portion of the display screen 107 can be composed of the display device 1.

Figure 15A:
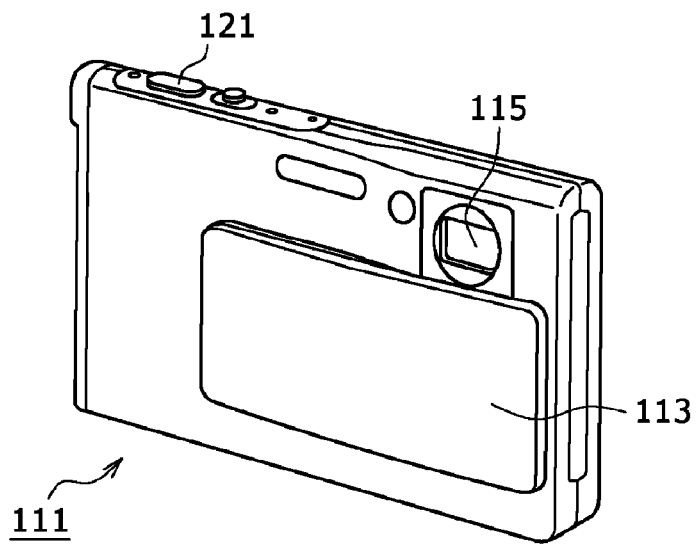
FIGS. 15A and 15B are respectively a perspective view showing a digital camera as another concrete example of the electronic apparatus to which the display device of the embodiment is applied when viewed from a front side, and a perspective view showing the digital camera as the another concrete example of the electronic apparatus to which the display device of the embodiment is applied when viewed from a back side.
Figure 15B:
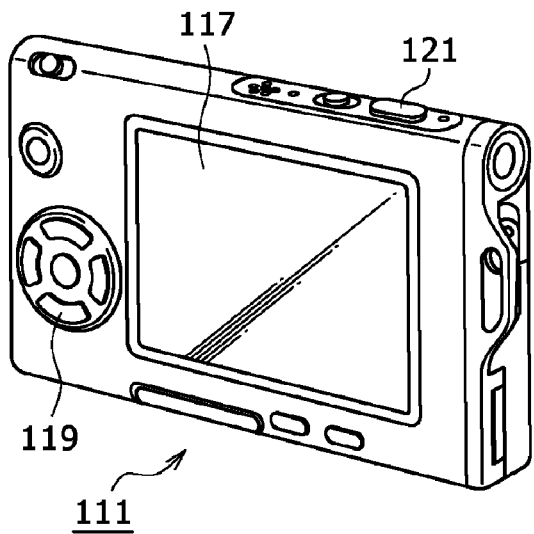

FIGS. 15A and 15B are respectively perspective views each showing a digital camera 111 as another concrete example of the electronic apparatus having the display device 1 incorporated therein. Here, FIG. 15A is the perspective view of the digital camera 111 when viewed from a front side, and FIG. 15B is the perspective view of the digital camera 111 when viewed from a back side.

The digital camera 111 shown in FIGS. 15A and 15B is composed of a protective cover 113, an image capturing lens portion 115, a display screen 117, a control switch 119, and a shutter button 121. Of these constituent elements, a portion of the display screen 117 can be composed of the display device 1.

Figure 16:
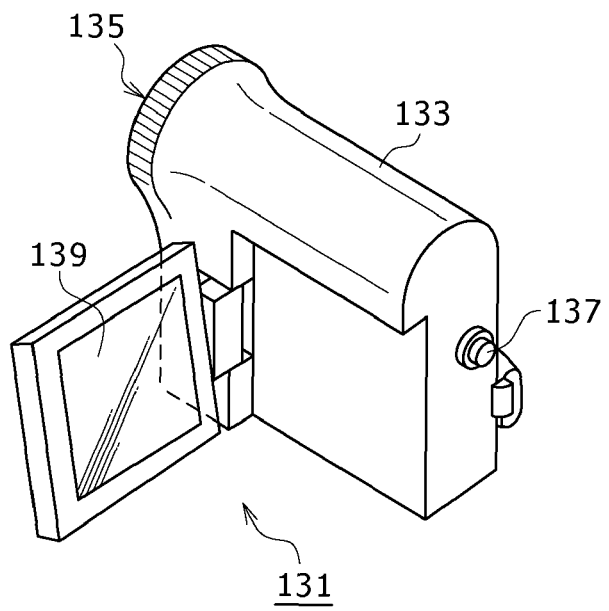
FIG. 16 is a perspective view showing an exterior appearance of a video camera as still another concrete example of the electronic apparatus to which the display device of the embodiment is applied.

FIG. 16 is a perspective view showing a construction of an exterior appearance of a video camera 131 as still another concrete example of the electronic apparatus having the display device 1 incorporated therein.

The video camera 131 is composed of an image capturing lens 135 which is provided on a front surface of a main body 133, and which serves to capture an image of a subject, a start/stop switch 117 with which the image capturing operation is started/stopped, and a display screen 139. Of these constituent elements, a portion of the display screen 139 can be composed of the display device 1.

Figure 17A:
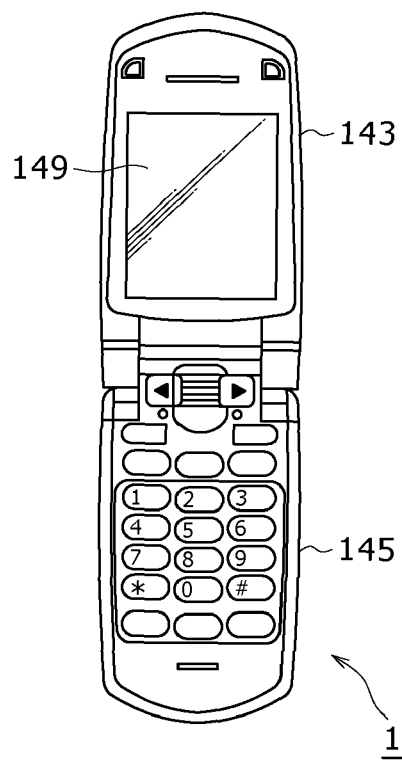
FIGS. 17A and 17B are respectively a front view showing an exterior appearance of a mobile phone as yet another concrete example of the electronic apparatus to which the display device of the embodiment is applied in a state in which chassis are opened, and a front view showing the exterior appearance of the mobile phone as the yet another concrete example of the electronic apparatus to which the display device of the embodiment is applied in a state in which the chassis are closed.
Figure 17B:
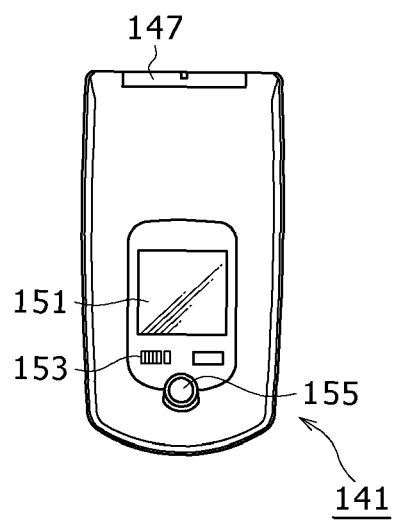

FIGS. 17A and 17B are respectively front views each showing a construction of an exterior appearance of a mobile phone 101 as yet another concrete example of the electronic apparatus having the display device 1 incorporated therein.

The mobile phone 141 is of a folded type. Thus, FIG. 17A shows the exterior appearance of the mobile phone 141 in a state in which chassis are opened, and FIG. 17B shows the exterior appearance of the mobile phone 141 in a state in which the chassis are closed.

The mobile phone 141 is composed of an upper chassis 143, a lower chassis 145, a connection portion (a hinge portion in this example) 147, a display screen 149, a subsidiary display screen 151, a picture light 153, and an image capturing lens 155. Of these constituent elements, a portion of each of the display screen 149 and the subsidiary display screen 151 can be composed of the display device 1.

Figure 18:
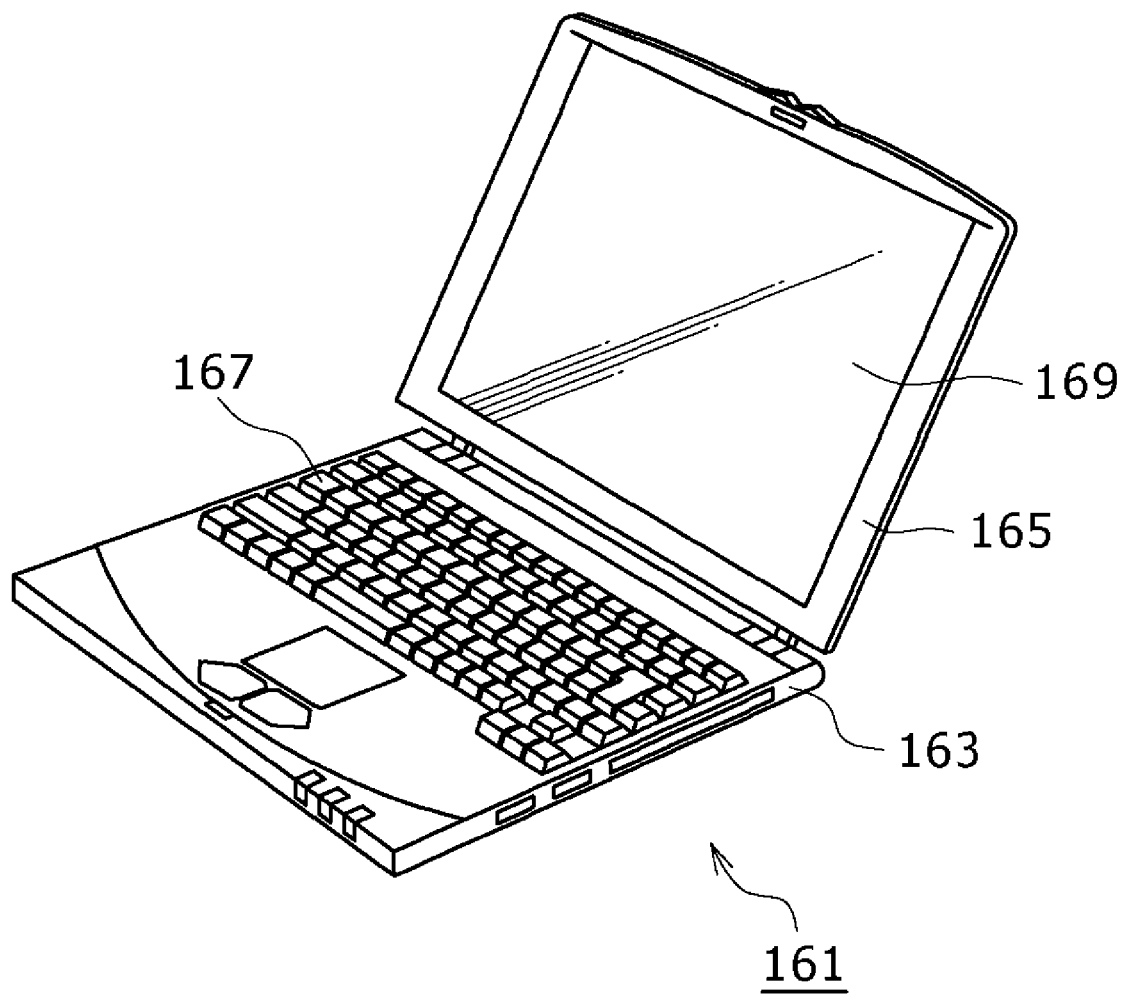
FIG. 18 is a perspective view showing an exterior appearance of a notebook-size personal computer as a further concrete example of the electronic apparatus to which the display device of the embodiment is applied.

FIG. 18 is a perspective view showing an exterior appearance of a notebook-size personal computer 161 as a further concrete example of the electronic apparatus having the display device 1 incorporated therein.

The notebook-size personal computer 161 is composed of a lower chassis 163, an upper chassis 165, a keyboard 167, and a display screen 169. Of these constituent elements, a portion of the display screen 169 can be composed of the display device 1.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A reflecting apparatus comprising:
an array of reflectors, corresponding to an array of light emitting portions, having a first subset of reflectors and a second subset of reflectors, with each one of the reflectors provided to a light emitting portion, wherein the first subset of reflectors guide light toward a first viewing position and the second subset of reflectors guide light toward a second viewing position that is different from the first viewing position,
wherein the first subset of reflectors and the second subset of reflectors are alternately disposed in either a transverse X-axis direction that is perpendicular to a thickness direction of the array, or a longitudinal Y-axis direction that is perpendicular to the thickness direction and the X-axis direction.

2. The reflecting apparatus of claim 1, wherein each of the reflectors are formed at predetermined angles so as to have a trapezoidal shape when viewed from a side surface.

3. The reflecting apparatus of claim 2, wherein optical axes of the reflectors of the first subset are based on a size of the array of reflectors and a distance from the respective reflector to the first viewing position, and optical axes of the reflectors of the second subset are based on the size of the array of reflectors and a distance from the respective reflector to the second viewing position.

4. The reflecting apparatus of claim 1, wherein each of the reflectors are formed in a conical frustum shape, the reflectors becoming wider near a light emitting side of each reflectors.

5. The reflecting apparatus of claim 1, wherein the first subset of reflectors is arranged in a first checkered pattern, and the second subset of reflectors is arranged in a second checkered pattern that is offset from the first checkered pattern.

6. A display device comprising:
a pixel array including a plurality of pixels, each pixel including a light emitting portion; and
a plurality of reflectors, one of said reflectors provided on a front surface of each of the pixels,
wherein the plurality of reflectors include a first subset of reflectors that direct light emitted from the respective light emitting portions toward a first viewing position, and a second subset of reflectors that direct light emitted from the respective light emitting portions toward a second viewing position that is different from the first viewing position, and
wherein the first subset of reflectors and the second subset of reflectors are alternately disposed in either a transverse X-axis direction that is perpendicular to a thickness direction of the array, or a longitudinal Y-axis direction that is perpendicular to the thickness direction and the X-axis direction.

7. The display device of claim 6, wherein a light emitting side of the pixel array is covered with an adhesive agent layer having protrusions corresponding to shapes of the reflectors, wherein areas between the protrusions correspond to the positions of the light emitting portions of the pixels.

8. The display device of claim 7, wherein the protrusions of the adhesive agent layer are covered with a reflecting layer.

9. The display device of claim 8, wherein the adhesive agent layer is covered with a transparent substrate.

10. The display device of claim 6, wherein each of the reflectors are formed at predetermined angles so as to have a trapezoidal shape when viewed from a side surface.

11. The display device of claim 10, wherein optical axes of the reflectors of the first subset are based on a size of the array and a distance to the first viewing position, and optical axes of the reflectors of the second subset are based on the size of the array and a distance to the second viewing position.

12. The display device of claim 6, wherein each of the reflectors are formed in a conical frustum shape, the reflectors becoming wider near a light emitting side of each reflectors.

13. The display device of claim 6, wherein the first subset of reflectors is arranged in a first checkered pattern, and the second subset of reflectors is arranged in a second checkered pattern that is offset from the first checkered pattern.

14. A stereoscopic video display system comprising:
a pixel array including a plurality of pixels, each pixel including a light emitting portion;
a plurality of reflectors, one of said reflectors provided on a front surface of each of the pixels;
wherein the plurality of reflectors include a first subset of reflectors that direct light toward a first viewing position and a second subset of reflectors that direct light toward a second viewing position that is different from the first viewing position, the first and second viewing positions defining a first viewpoint at a first rotational orientation of the stereoscopic video display system
wherein the light emitting portions cooperate with the reflectors to enable stereoscopic display of images in a plurality of different rotational orientations of the stereoscopic video display system, and
wherein the first subset of reflectors and the second subset of reflectors are alternately disposed in either a transverse X-axis direction that is perpendicular to a thickness direction of the array, or a longitudinal Y-axis direction that is perpendicular to the thickness direction and the X-axis direction.

15. The stereoscopic video display system according to claim 14, wherein the plurality of reflectors further include a third subset of reflectors that direct light toward a third viewing position and a fourth subset of reflectors that direct light toward a fourth viewing position that is different from the third viewing position, the third and fourth viewing positions defining a second viewpoint at a second rotational orientation of the stereoscopic video display system that is different from the first rotational orientation.

16. The stereoscopic video display system according to claim 15, wherein the plurality of reflectors further include a fifth subset of reflectors that direct light toward a fifth viewing position and a sixth subset of reflectors that direct light toward a sixth viewing position that is different from the fifth viewing position, the fifth and sixth viewing positions defining a third viewpoint at a third rotational orientation of the stereoscopic video display system that is different from the first and second rotational orientations, and
a seventh subset of reflectors that direct light toward a seventh viewing position and an eighth subset of reflectors that direct light toward an eighth viewing position that is different from the seventh viewing position, the seventh and eighth viewing positions defining a fourth viewpoint at a fourth rotational orientation of the stereoscopic video display system that is different from the first, second and third orientations.

17. The stereoscopic video display system according to claim 16, wherein the third and fourth orientations are different from the first and second orientations by about 45 degrees, respectively.

* * * * *